(12) United States Patent
Skura et al.

(10) Patent No.: US 7,747,759 B1
(45) Date of Patent: Jun. 29, 2010

(54) TECHNIQUES FOR MAINTAINING PERSISTENT PREFERENCES

(75) Inventors: David O. Skura, Zephyr (CA); Michael A. Carroll, Toronto (CA); Blair R. Bishop, Toronto (CA); Yan Jun An, Toronto (CA); Siamak Safarian, Richmond Hill (CA)

(73) Assignee: Teradata US, Inc., Miamisburg, OH (US)

( * ) Notice: Subject to any disclaimer, the term of this patent is extended or adjusted under 35 U.S.C. 154(b) by 1211 days.

(21) Appl. No.: 10/723,293

(22) Filed: Nov. 26, 2003

(51) Int. Cl.
*G06F 15/16* (2006.01)

(52) U.S. Cl. .............. 709/228; 709/217; 709/224; 709/227

(58) Field of Classification Search .......... 709/224, 709/229, 227, 228
See application file for complete search history.

(56) References Cited

U.S. PATENT DOCUMENTS

| | | | |
|---|---|---|---|
| 5,835,724 A * | 11/1998 | Smith ..................... 709/227 |
| 5,875,327 A | 2/1999 | Brandt et al. ................. 713/1 |
| 6,101,482 A * | 8/2000 | DiAngelo et al. ............. 705/26 |
| 6,321,256 B1 | 11/2001 | Himmel et al. ............. 709/210 |
| 6,349,337 B1 * | 2/2002 | Parsons et al. ............. 709/228 |
| 6,374,300 B2 | 4/2002 | Masters ..................... 709/229 |
| 6,401,094 B1 | 6/2002 | Stemp et al. ................. 707/10 |
| 6,473,802 B2 | 10/2002 | Masters ..................... 709/229 |
| 6,926,199 B2 * | 8/2005 | Jay et al. ..................... 715/744 |
| 7,107,226 B1 * | 9/2006 | Cassidy et al. ............... 705/14 |
| 7,310,733 B1 * | 12/2007 | Pearson et al. ............. 709/228 |
| 7,409,710 B1 * | 8/2008 | Uchil et al. ................. 713/155 |
| 2002/0072980 A1 * | 6/2002 | Dutta ......................... 705/26 |
| 2002/0188451 A1 * | 12/2002 | Guerra et al. ............... 704/270 |
| 2003/0063779 A1 * | 4/2003 | Wrigley ..................... 382/116 |
| 2003/0110266 A1 * | 6/2003 | Rollins et al. ............... 709/227 |
| 2004/0003096 A1 * | 1/2004 | Willis ......................... 709/228 |
| 2004/0068572 A1 * | 4/2004 | Wu ............................ 709/229 |

* cited by examiner

*Primary Examiner*—Ramy M Osman
(74) *Attorney, Agent, or Firm*—Schwegman, Lundberg Woessner P.A.

(57) ABSTRACT

Methods, systems, and data structure provide persistent preferences for services over a network. An entity's preference is recorded in an external location from the entity. The preference is automatically installed in a local environment of the entity when the entity attempts to access a service. The service detects the preference in the local environment and automatically processes the preference.

14 Claims, 4 Drawing Sheets

TECHNIQUES FOR MAINTAINING PERSISTENT PREFERENCES

FIELD OF THE INVENTION

The present invention relates to network transactions, and more particularly to techniques for maintaining persistent preference data for services over a network.

BACKGROUND OF THE INVENTION

End users are increasingly accessing services offered by organizations over a network. More particularly, services are often browser-enabled and include interfaces that permit an end user to access the services using a World-Wide Web (WWW) browser that is interfaced to the Internet.

Many services include a variety of processing that is often time-consuming or repetitive for end-users. As a result, the services permit preferences to be stored in local locations associated with the end-users. In many cases, these preferences are stored as WWW cookies with specific names and formats that the services can locate and consume when needed. Thus, an end-user can avoid repetitive tasks at initialization with the service by saving an appropriate service preference cookie on the end-user's computing environment or device.

Accordingly, when an end-user logs into a service via a WWW browser, the preference cookie is located and supplied automatically and seamlessly to the service. The service then processes the cookie to ensure that the end-user is configured in a manner that the end-user prefers or in a service processing state that the end-user prefers.

One major drawback with cookies and locally stored preferences in general, is that if the end-user does not always access the service from the same computing environment or device, then the preference is not obtainable and not detected. Thus, the use of cookies is valuable for a specific computing environment or device, but not truly portable for the end-user. Correspondingly, when the end-user does not use the computing device that was used to create his/her initial preference cookie, the service is unable to acquire the end-user's preference during initialization and the end-user is forced to try to remember the preference or manually recreate it within the service.

Therefore, there is a need to create improved portability techniques for maintaining preferences.

SUMMARY OF THE INVENTION

In various embodiments of this invention preferences are persistently maintained and managed. More specifically, a method for managing a preference is described. A preference is received over a network and is associated with an entity during a first transaction with a service. The preference is stored in a data store. Next, a second transaction made by the entity for the service is identified. The preference is installed on a computing device of the entity and the service is activated. The service automatically uses the preference from the computing device of the entity.

In still another embodiment of the present invention, a preference managing system is presented. The preference managing system includes a data store, a service, and a preference manager. The data store houses preferences of entities. The service is accessed by the entities, and the preference manager records the preferences and associates the preferences with the entities. Moreover, the preference manager installs the preferences in locations that are local to the entities and expected by the service prior to the service initializing for access by the entities.

In another embodiment of the present invention, a portable preference data structure implemented in a computer-readable medium is taught. The portable preference data structure includes an entity identifier and preference data. The entity identifier and preference data combine to form a data store preference record for an entity. The record is stored externally from an environment of the entity, and the preference data is automatically transferred and installed in a local environment of the entity when the entity attempts to access a service, which consumes the preference data.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims and their equivalents.

As used herein an entity includes an electronic representation of an end-user, an electronic representation of an electronic or computing resource (e.g., printer, server, organization, department, and the like), or an electronic application, service, or system. The entity is a requestor of a service. The service provides some functionality that the entity desires to interact during an electronic transaction. The entity accesses the service over a network. In one embodiment, the entity accesses the service indirectly over the Internet via a WWW browser application. In some embodiments, the service is integrated into a larger service or system. Thus, the service can be a stand alone and independent service or a service that is dependent upon a larger service or system.

A preference or preference data are commands, instructions, identifiers, or other data that can be processed by the service for purposes of reaching a particular processing state within the service. For example, a preference can be a database search query that is automatically processed during initialization of the service and the results automatically displayed or available to the entity. A preference need not be a single command, instruction, or identifier, such that in some embodiments a preference is a series of commands, instructions, or identifiers that direct the service to process a number of operations and traverse through a number of service processing states in order to reach a desired end state. Thus, in some embodiments, the preference can be a history of an entity's prior transaction with the service, which is automatically processed and recreated during a new transaction on behalf of the entity.

One embodiment of the invention is implemented within the Teradata Demand Chain Management product using the Teradata data warehouse and distributed by NCR Corporation of Dayton, Ohio. Furthermore, various embodiments of this invention are presented as examples that are related to the Customer Relationship Management (CRM) and Business Analysis. These examples are illustrative and are not intended to be limiting, although the embodiments of this invention are particularly beneficial and useful in the CRM and Business Analysis industries.

Figure 1:
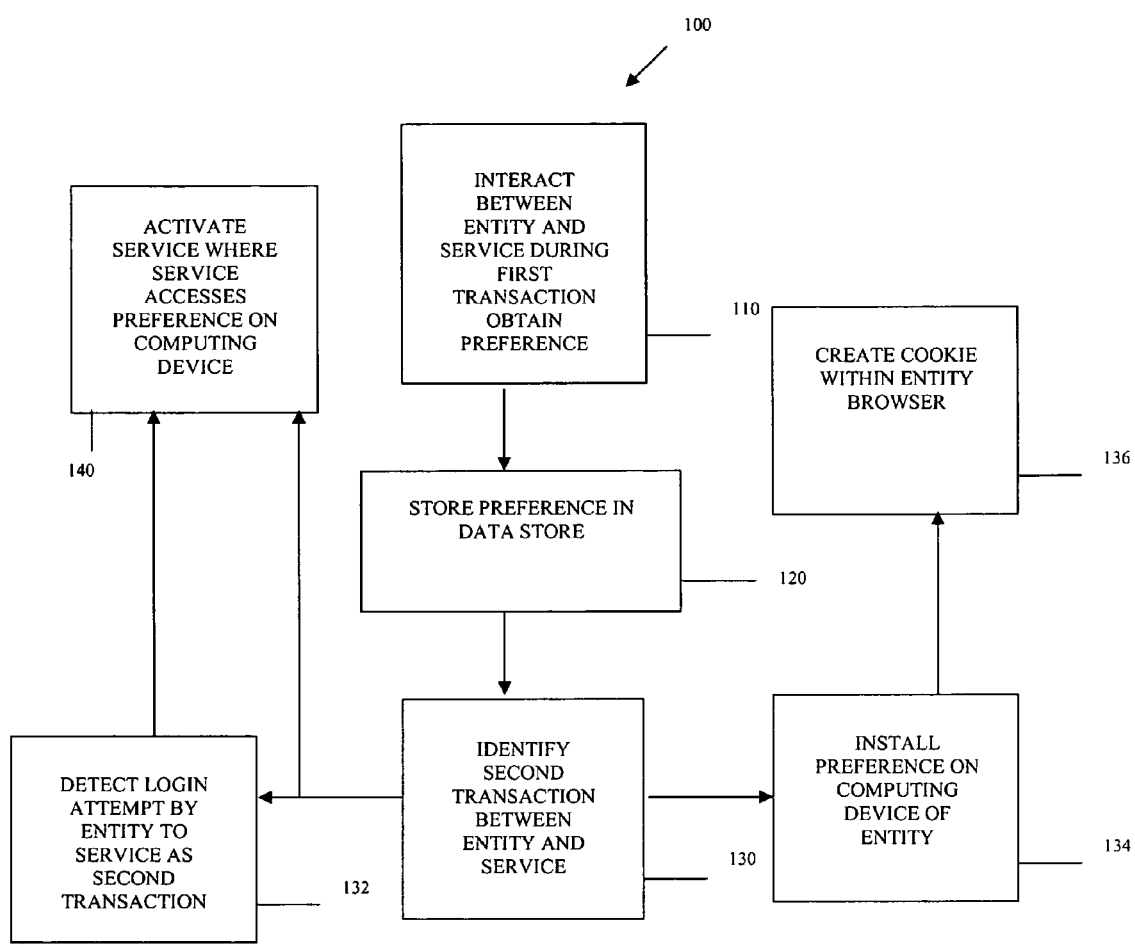
FIG. 1 depicts a flow diagram representing a method for managing a preference.

FIG. 1 is a flow diagram representing one method 100 for managing a preference. The method 100 is implemented in a computer-readable medium and is accessible over a network. In one embodiment, the processing of the method 100 is implemented as a front-end interface to a service that is accessible over the network to an entity. In another embodiment, the processing of the method 100 is implemented within the processing logic of the service.

Initially, at 110, an entity engages in a transaction with a service over a network. The transaction can be viewed as a session between the entity and the service. The session can be terminated abnormally, normally, via defined events (e.g. time outs for entity inactivity with the service), and the like. During the first transaction, the entity either directly or indirectly identifies a preference that the entity desires to maintain. Direct identification can be achieved via one or more interface screens supplied within the service, where the entity elects an option to save a preference and provides some identifier for the saved preference. Indirect identification can be achieved through the service or the processing of the method 100 detecting the actions being performed by the entity during the first transaction and recording these with a transaction identifier. In this way, indirect identification of a preference can be used to maintain an entity's processing history during the first transaction with the service.

At 120, the preference obtained during the first transaction is stored in a data store. The data store can be an electronic file, a data base, or a plurality of data bases organized as a data warehouse. In one embodiment, the preference is stored in a portable data format, such as Extensible Markup Language (XML). Of course, any intermediate or proprietary data format can be used as the native data format for the preference within the data store. The preference is recorded within the data store with an entity identifier and a preference identifier. The preference identifier can be a manual supplied description received from the entity, or it can be an automatically generated identifier, such as a first transaction identifier and the like.

At some later point in time, the entity associated with the stored preference will establish a second transaction or second session with the service. Accordingly, at 130, the processing of the method 100 identifies a second transaction between the entity and the service occurring over a network. In one embodiment, the processing of the method 100 acts a proxy of front-end interface for the service, such that the second transaction is detected during an entity's attempt to log into the service at 132 for the start of the second transaction. In other embodiments, the processing of the method 100 is invoked initially by the service immediately after the entity successfully logs into the service for the second transaction.

At 134, the previously stored preference is installed on a computing device of the entity. Installation can occur before the entity takes any action with the service during the second transaction. For example, the entity can be configured to use the saved preference as a default preference that is automatically installed as soon as the entity establishes a login to the service. In other embodiments, the preference is not installed until affirmatively instructed to do so by the entity from within the service. For example, the entity logs into the service, accesses a saved preferences menu, and manually selects a specific saved preference for installation.

In one embodiment, the entity is accessing the service over the Internet through a WWW browser. In these embodiments, the preference is installed within the entity's computing environment or computing device as a WWW cookie file at 136, such that the browser is enabled to supply the cookie to the service for processing during initialization of the service or when requested by the service.

Traditionally, cookies provide techniques for saving preferences for end-users, but cookies are limited to the computing environment in which they were created. That is, a created cookie is only useful when an end-user access a service that consumes that cookie from the computing device that initially created the cookie. Cookies are not portable from computing device to computing device, such that entities that have laptops or more than a few access computers are forced to recreate and manage cookies across multiple computers. With the teachings of this invention, this problem is solved, since an entity's preference is externally managed and populated to an entity's local computing device when needed. This permits preferences to remain persistent and become more portable than what has been conventionally achievable.

In some embodiments, the processing of the method 100 can check the local computing device of the entity to determine if the preference is already present before installing the preference. This can more rapidly achieved with identifier's or other information associated with the preference, such that only the identifier or a check sum is checked to make a determination if the preference is already properly installed on the entity's computing device. In other embodiments, no check is made at all and if a prior preference is already installed on the entity's computing device, the processing of the method 100 simply writes over it and replaces it each time the entity establishes a new transaction or session with the service.

Again, in some embodiments, the preference is installed in a portable data format, such as XML within the entity's computing environment or on the entity's computing device. By using a portable data format, such as XML, the preference can be used from the entity's computing environment or computing device with a variety of other additional services, when translation utilities are developed to provide the preference in a native data format expected by those additional services. In this way, the preferences of this invention are even more portable and interoperable between disparate services and disparate computing environments.

Once the preference is installed on the entity's computing device or within the entity's computing environment, the service is activated at 140 where the preference is consumed or processed by the service. In one embodiment, the preference is a search query that is automatically executed by the service on behalf of the entity, such that the search results are immediately displayed to the entity for consumption. In other embodiments, the preference is a particular configuration state or processing state of the service, such that when the preference is executed the entity is placed in a particular state that it desires within the service. Thus, in some embodiments, the preference can actually be a series of operations that the service processes on behalf of the entity. For example, the preference may be a history of a previous entity transaction or session, and when the service processes the preference the entity is placed back in a processing state of the service that the entity had obtained in that previous transaction. In still other embodiments, the preference may only affect the look and feel of the interface of presentation screens associated with the service. Thus, a preference can drive both presentations and substantive processing of the service.

It is now understood how a preference can be managed and made persistent across multiple computing environments and computing devices. The preference is externally managed and locally installed when needed. Entities can now enjoy preference portability in ways that were not previously capable with traditional techniques.

Figure 2:
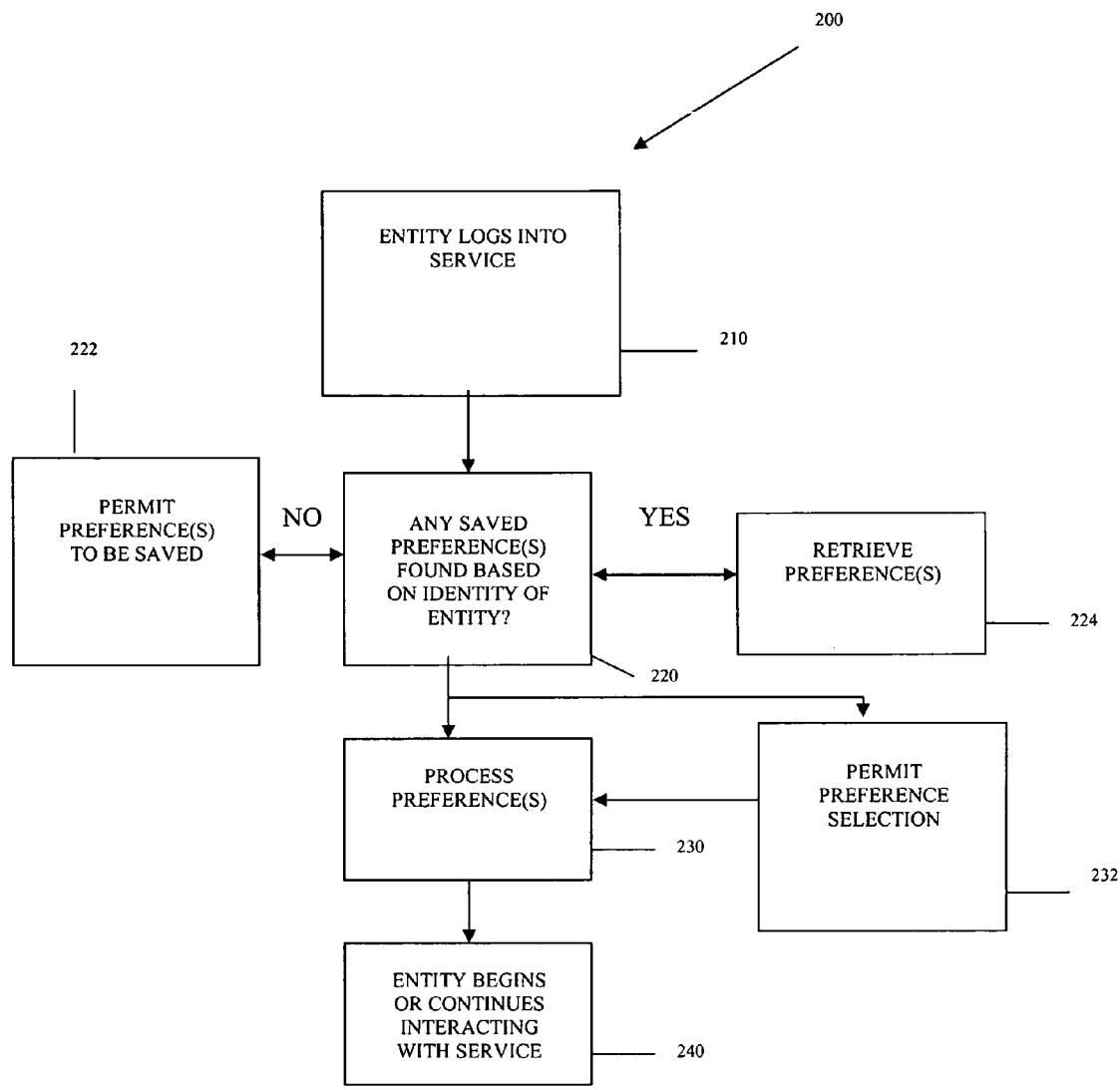
FIG. 2 depicts a flow diagram representing another method for managing a preference.

FIG. 2 is a flow diagram representing another method 200 for managing a preference. The method 200 is implemented in a computer-readable medium. The method is accessible over a network. In one embodiment, the processing of the method 200 is a stand alone application that interfaces with a service. In another embodiment, the processing of the method 200 is integrated and is an integral part of the service.

Initially, at 210, an entity logs into a service over a network. In some embodiments, the desired service is actually a sub-component of a larger service or system, such that the entity actually logs into the larger service of system and not directly into the service. Once the entity is logged into the service, either directly or indirectly, a new transaction or session is established between the entity and the service.

As soon as the entity is identified to the service via an entity identifier to some other identification mechanism (e.g., digital certificate, digital signature, and the like), processing continues at 220. At 220, the entity's identification is used to determine if the entity is associated with any saved preference (s). Policies may also be associated with any detected saved preference(s), such that under some circumstances policies direct the processing of the method 200 to automatically obtain a preference as a default preference and execute the preference on behalf of the entity. Under other circumstances, policies can present via interface screens saved preference(s) associated with the entity and provide commands which permit the entity to manual select and process desired preference (s). Policies are configurable and can be accessible from the processing of the method 200 or alternatively from the service.

If, at 220, a saved preference(s) is detected for the entity, then, at 224, the preference(s) are retrieved from a data store. If there are no preference(s) associated with the entity, then at 222, and at any point during the transaction or session of the entity, the entity can access one or more commands or options within the service to save a preference for subsequent use by the processing of the method 200.

When a preference is obtained, the preference is processed at 230 by the service. Again, the processing of the preference can occur automatically within the service or alternatively the processing can be manually driven by entity selection as depicted at 232. Policies can be used in the manners described above to determine whether automatic or manual processing of the preference occurs.

Before the preference is processed, the preference is installed within the computing environment or on the computing device of the entity. The service actually detects and processes the preference from a defined location that is local to the entity. In one embodiment, the entity's local location is a WWW cookie that is accessible to an entity's WWW browser. Installing the preference locally to the entity, permits services that are designed to acquire preferences locally from entity's to use the teachings of the present invention. Moreover, by installing the preferences locally during each transaction or session, the preferences become persistent and portable from disparate and different computing environments and computing devices.

At 240, the entity continues interacting with the service after the preference is processed. If the entity did not have a preference saved during a current transaction or session but saved one during the current transaction, then the next time the entity engages in a new transaction with the service that saved preference will be available for use in the manners described herein and above.

Figure 3:
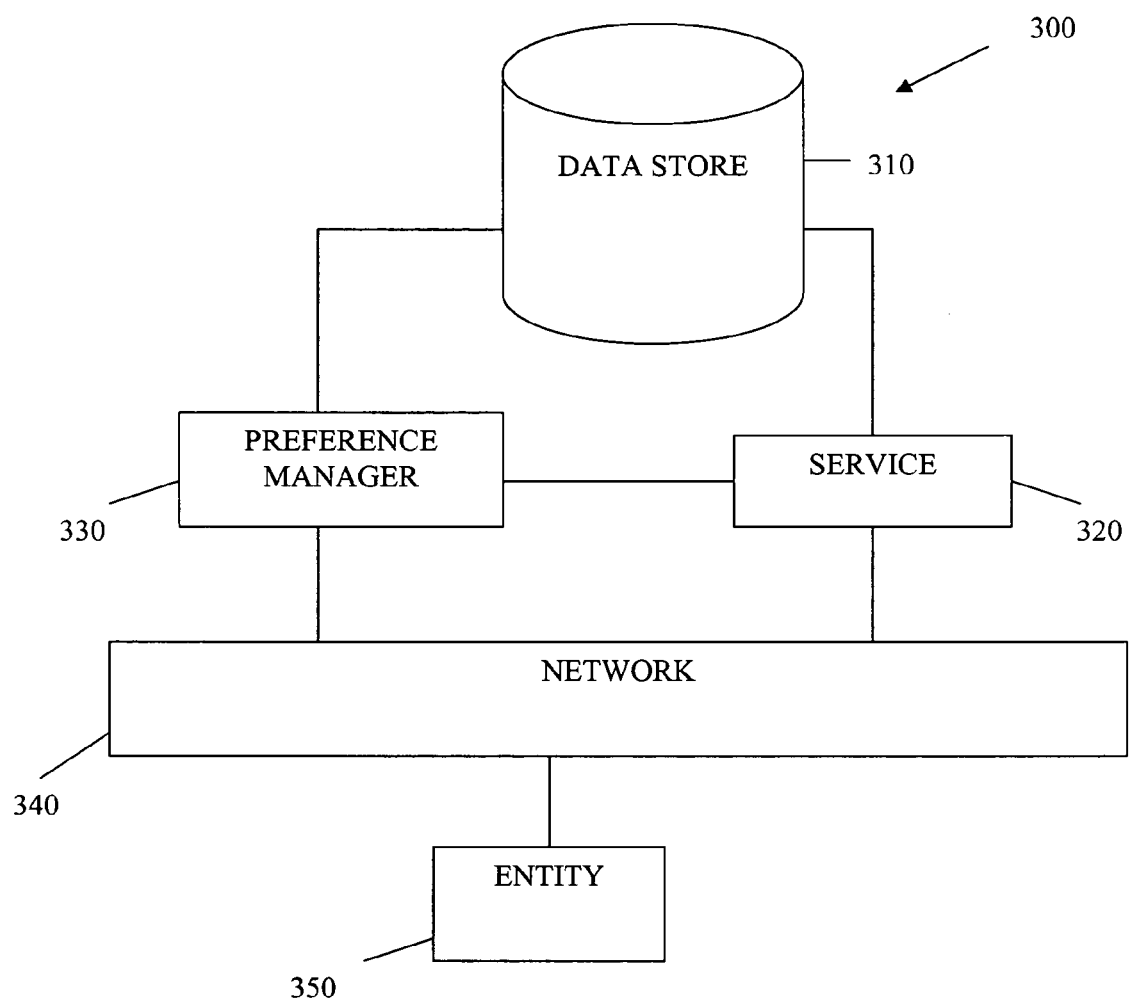
FIG. 3 depicts a diagram of a preference managing system.

FIG. 3 is a diagram of one preference managing system 300. The preference management system 300 is implemented in and accessible from a computer-readable medium. The preference managing system 300 is accessible over a network 340. In one embodiment, the preference managing system 300 is integrated within a service 320 (not shown in FIG. 3). In an alternative embodiment, the preference managing system 300 is external to and interfaced with the service 320.

The preference managing system 300 includes a data store 310, a service 320, and a preference manager 330. The data store 310 is for housing preferences associated with entities 350. The preferences are consumed and processed by the service 320. The processing results associated with the preferences can drive processing states of the service 320 or drive the interfaces and/or presentation screens of the service 320 as it presents itself to the entities 350.

During operation of the preference managing system 300, an entity 350 accesses a service 320 over a network 340. In some embodiments, the access is a direct login to the service 320. In other embodiments, the access is a login to a different system or service to which the service 320 is a part of. For each login transaction or session with the service 320, the entity 350 can perform a number of operations or commands associated with the service 320. A transaction or service 320 can be terminated abnormally, normally, or via defined events, such as a time out for lack of entity 350 actions within the service 320.

Upon initial interaction between the entity 35 and the service 320 during a transaction or session, the preference manager 330 is invoked. Invocation of the preference manager 330 can be automatic, such as when the preference manager 330 is acting as a proxy for some actions of the service 320. Invocation of the preference manager 330 can also be made by the service 320.

When the preference manager 330 is invoked, the preference manager obtains a preference for the entity 350 from the data store 310 and installs the preference on the entity's computing device or locally within the entity's computing environment. In one embodiment, the preference is installed as a WWW cookie file if a directory of the entity's computing device. In these embodiments, the entity 350 uses a WWW browser to access the service 320 and the cookie is accessible to the browser, such that the browser supplies the cookie when instructed to do so by the service 320.

In some embodiments, the preference manager 330 provides an identifier for the preference to the service 320, such that the service can present the preference for selection by the entity 350. When the entity, selects the preference the preference selected is installed on the computing device or within the computing environment of the entity 350 and supplied to the service 320 for processing.

In an embodiment, the preference manager 330 stores the preference in the data store 310 and installs the preference local to the entity 350 in a portable data format, such as XML. This portable data format combined with schemas and translators can permit the preference to be consumed and used by other services that are disparate from the service 320 of the preference managing system 300.

When the service 320 decides to process the preference; the preference is requested or obtained from locations that are local to the entity 350. The service can use configurable policies associated with the entities 350 and/or the preferences to make the decision as to when a preference is to be processed. In some embodiments, a default policy directs the service 320 to automatically process the preference from the locations local to the entity 350 after the entity 350 has successfully logged into the service 320. In other embodiments, the service 320 waits for the entity 350 to manually direct it to process the preference from the entity's local location.

Once the preference is processed by the service 320, the entity 350 is placed in a desired substantive processing state of the service 320 or presented with a desired presentation interface. In this way, the entity's preferences are persistent across multiple computing platforms and environments. Preferences can now be obtained from any computing device that the entity 350 decides to use when accessing the service 320. Traditionally, this has not been the case, since preferences associated with cookies were dependent upon the computing device in which they were originally created.

Moreover, if the entity 350 has no saved or previously stored preferences, then the service 320 in combination with the preference manager 330 permit the entity 350 to selectively save and store one or more desired preferences and in some instances define and associate policies with those saved preferences. Thus, an entity 350 can configure and save preferences for the service 320 in manners desired by the entity 350.

Figure 4:
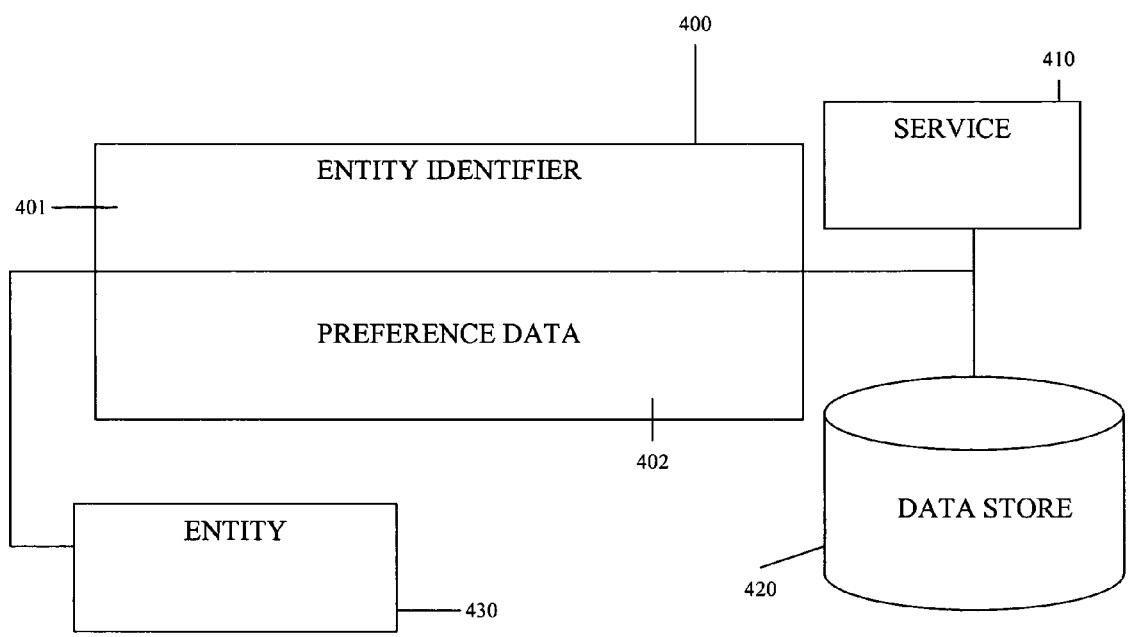
FIG. 4 depicts a diagram representing a portable preference data structure.

FIG. 4 is a diagram representing one portable preference data structure 400. The portable preference data structure 400 is implemented in a computer-readable medium and is accessible over a network. The portable preference data structure 400 is stored locally to an entity 430 and externally from an entity 430 in a data store 430. The portable preference data structure 400 can be in any data format and in some embodiments is in a portable data format, such as XML.

The portable preference data structure 400 includes an entity identifier 401 and preference data 402. The entity identifier 401 and the preference data 402 combine to form a preference record that is housed for the entity 430 in a data store 420 that is externally located across a network from the entity 430. In some embodiments, the preference record also includes a service identifier, for uniquely identifying a service 410 that is associated with the preference data 402. The preference data can be commands, options, or identifiers that can be consumed or processed by the service 410 for purposes of obtaining a particular processing state of the service 410 or a particular presentation state of the service 410.

The preference data 402 is automatically transferred and installed locally to the entity 430 when the entity 430 establishes a session or transaction with the service 410. In one embodiment, when the entity 430 establishes a session with the service 410, a value for the entity identifier 401 is obtained and used to acquire an instance of the portable preference data structure 400 from the data store 420. Next, the preference data 402 is automatically installed as a cookie within a directory of the entity's computing device. The entity's browser then supplies the cookie when instructed to do so by the service 410, and the service 410 processes the preference to place the entity in a desired presentation or processing state within the service 410.

In some embodiments, the preference data 402 is an executable search query that the service 410 executes in order to obtain and present search results to the entity 430 as a default action each time the entity 430 logs into the service 410. Moreover, since the preference data 402 is installed local to the entity 430, the entity 430 can use any computing device to access the service 410 and obtain the proper initial configuration and preference data. The service 410 need not be modified in any substantial manner, since the service 410 can still obtain preferences from the entity 430 in manners it normally expects (e.g., via WWW cookies).

Instances of the portable preference data structure 400 can be populated during interactions with between the service 410 and the entity 430. Furthermore, a single entity 430 can be associated with more than one portable preference data structure 400. In some embodiments, the portable preference data structure 400 is managed by a separate front-end interface to the service 410. In other embodiments, the portable preference data structure 400 is managed by applications integrated and integral to the service 410.

Additionally, the portable preference data structure 400 can include a series of transactions or commands within any particular instance of the preference data 402. In this way, the preference data 402 can be a history of an entity's prior session with the service 410 that was automatically or manually captured during the prior session. This history can be automatically acquired from the data store 420 and populated locally to the entity 430 and supplied to the service 410. The service 410 uses the history to put the entity 430 back in a processing state with the service 410 that the entity 430 had during a prior transaction.

The portable preference data structure 400 is managed externally and installed locally on computing devices or within computing devices associated with entities 430. In this manner, the portable preference data structure can be made persistent across multiple computing platforms and provides improved ease of use for entities 430 that access a service 410 over a network.

The above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method for managing a preference implemented in a computer-readable storage medium and to process on a computer, comprising:

receiving a preference over a network associated with an entity during a first transaction with a service, the entity directly identifies the preference during that first transaction where the entity elects an option to save the preference and provides an identifier for the preference that is being saved;

storing the preference in a data store with the identifier and associating it with the entity and associating configurable policies with the preference and identifier;

identifying a second transaction made by the entity for the service during a new session and after the first session between the entity and the service has terminated normally, abnormally, or via defined events;

installing the preference on a computing device of the entity and the configurable policies determine whether automatic or manual processing of the preference is to occur by the service; and activating the service, the service automatically uses the preference from the computing device of the entity to place the computing device in a processing state driven by the preference or to present on the computing device a presentation interface the entity is expecting in response to the preference.

2. The method of claim 1 wherein the installing further includes creating a cookie within a browser, wherein the cookie includes the preference and the service consumes the cookie to acquire the preference.

3. The method of claim 1 wherein the receiving further includes identifying the preference as a search query that is processed by the service.

4. The method of claim 1 wherein the storing further includes storing the preference in an Extensible Markup Language (XML) data format within the data store.

5. The method of claim 4 wherein the installing further includes installing the preference in an XML format on the computing device.

6. The method of claim 1 wherein the identifying further includes detecting a login as the second transaction from the entity to the service and performing the installing immediately after the login is successful.

7. The method of claim 1 wherein the processing of the method acts as a front-end interface to the service.

8. A preference managing system implemented in a computer-readable storage medium processed by a computer, comprising:

a data store for housing preferences from entities, where the preferences are accessed in a computer-readable medium by a preference manager;

a service that is accessed by the entities; and the preference manager, implemented in a computer-readable medium as instructions that is executed by the computer, the preference manager acquires the preferences from the data store, each preference previously identified by the entities via an interface where the entities elect options to have their preferences saved in the data store with identifiers during first sessions that subsequently terminates normally, abnormally, or via defined events, the first sessions also associating configurable policies with the preferences, and the preference manager associates the preferences with the entities using the identifiers, and the preference manager installs the preferences in locations that are local to the entities and expected by the service to be local to the entities prior to the service initializing itself with the preferences for access by the entities during subsequent new sessions and the configurable policies determine whether the preferences are automatically or manually processed by the service, and once the preferences are processed by the service the entities are placed in a processing state driven by the preferences or presented with a presentation interface that the entities are expecting in response to the preferences.

9. The preference managing system of claim 8 further comprising browsers that are used by the entities to access the service over the Internet.

10. The preference managing system of claim 9 wherein the preferences are cookies located in storage locations accessible to the browsers.

11. The preference managing system of claim 8 wherein the preference manager is automatically invoked when the entities attempt to access the service for a first time during a transaction.

12. The preference managing system of claim 8 wherein the preference manager is invoked by the service to record the preferences during transactions between the service and the entities.

13. The preference managing system of claim 8 wherein the preference manager stores the preferences and installs the preferences in Extensible Markup Language (XML) formats.

14. The preference managing system of claim 8 wherein the entities are at least one of electronic representations of users, electronic representations of applications, and electronic representations of applications.

* * * * *